3,531,993
INDUSTRIAL THERMOMETRY
James Bristow Karn, 815 Camp Horne Road,
Pittsburgh, Pa. 15237
Filed Dec. 6, 1968, Ser. No. 781,920
Int. Cl. G01k 1/14, 7/04
U.S. Cl. 73—359                                    3 Claims

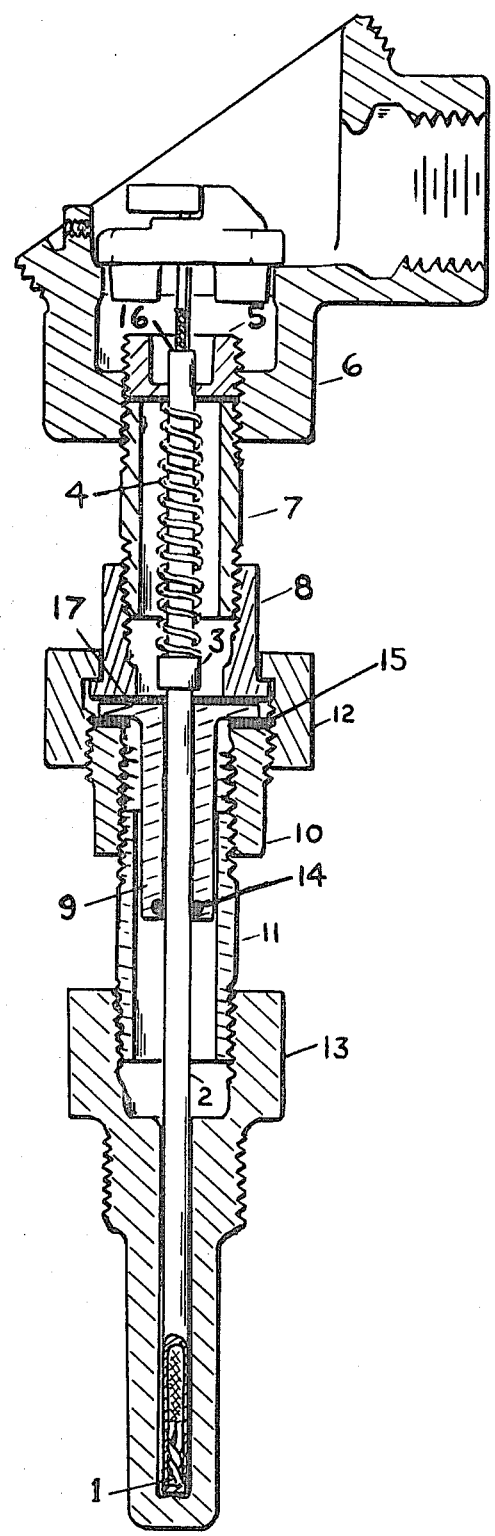

ABSTRACT OF THE DISCLOSURE

A temperature sensor in a tube which extends from a head piece at one extremity of the tube to a well at the other extremity of the tube. The head piece and well enclose the tube. Extending between the well and head piece enclosing the midportion of the tube are three elements (first nipple, a union, and second nipple) connected end to end with the first nipple connected to the head piece and the second nipple connected to the well. The union is further divided into a first half and a second half held together by a ring nut. The enclosed tube is spring biased to contact the internal surface of the closed end of the well. An O-ring seals the inside of the well from the inside of the first nipple. A spacer is partly contained in the second nipple and partly in the union. The O-ring is placed around the tube inside the spacer at a point inside the second nipple.

---

The invention relates in general to industrial thermometry and more particularly to joining a temperature sensing device to a fluid filled system the temperature of which is to be measured.

An object of this invention is to pass a moveable resiliently positioned temperature sensing means through a sliding seal into a fluid filled system.

Another object of the invention is to provide for pressing a temperature sensing means in firm contact with a surface the temperature of which is to be measured.

Another object of the invention is to provide for readily removing and replacing a temperature sensing means which is to be mounted in firm contact with a surface, the temperature of which is to be measured.

Other objects and a fuller understanding of the invention may be had by referring to the following description taken in conjunction with the accompanying drawing in which the figure shows a thermocouple assembly embodying the invention.

Referring to the drawing, there is shown a cross sectional assembly view of a thermowell, piece 13, in which is placed a temperature sensing element, piece 1, such as a thermocouple junction or a wire resistance thermometer. The temperature sensing element piece 1 is contained in the end of a tube, piece 2. Element piece 1 may or may not be integrally attached to the tube piece 2, and piece 1 may or may not be exposed at the end of piece 2. Tube piece 2 is blocked to the internal passage of fluids by having its lower end closed or by having a substance such as a refractory cement higher up in the tube around the leads to the temperature sensing device. Part 16 indicates the possible location of such a refractory cement for sealing the leads. Tube piece 2 is sealed around its external surface by piece 14. Piece 14 is an O-ring seal which maintains a sliding seal between piece 2 and the rest of the system. The tube, piece 2, has an external collar, piece 3, against which rests helical spring, piece 4. The helical spring, piece 4, presses against internal collar, piece 5, which restrains the spring causing it to press against external collar, piece 3. In sequence thereafter a standard thermocouple head piece 6, pipe nipple piece 7, pipe union first half piece 8, gasket piece 15, pipe union second half piece 10, pipe union ring nut piece 12, second pipe nipple piece 11 all serve to join spring loaded tube piece 2 and its companion part temperature sensing means piece 1 to cause them to bear forcefully against the interior end surface of the thermowell piece 13. With expansion and contraction of the thermowell there is an accompanying movement of piece 2, piece 1, and spring action of piece 4 so as to maintain a path of good thermal contact between the thermowell interior tip and the temperature sensing means piece 1. A spacer being a bored cylindrical piece with a flanged end, piece 9, is held in the pipe union by its flange which is held between piece 8, piece 15, and piece 10. Piece 15 is a washer shaped gasket placed under the flange to maintain a fluid tight system. The O-ring piece 14 is located in an internal groove of piece 9. The spacer piece 9 serves to retain and center tube piece 2 and associate components. This feature increases durability and convenience during industrial plant site handling and assembling. Piece 13 is not necessarily limited to being a thermowell and may represent any fluid filled system such as an oil filled bearing lubrication chamber. The entire assembly can be mounted projecting into a pressure chamber filled with liquid or gas directly without using a thermowell part 13. There exists the possibility that thermowell piece 13 may fail in service by corrosion. The thermowell becomes then part of the fluid filled system. Piece 14 and piece 15 then becomes a seal against fluid in the fluid filled system.

The essential components of the invention are means for placing a temperature sensing element against a surface the temperature of which is to be measured, spring loading means for firmly pressing said means for placing said temperature sensing element against said surface, sliding seal means to maintain a fluid tight system with movement of said spring loading means, opposing means to back up the recoil action of the spring, and a suitable housing assembly to unite the above other components into a convenient functional form. In the drawing, piece 2 is means for placing a temperature sensing element against a surface. Piece 4 is the spring portion of the spring loading means. Piece 5 is the immediate point of application of opposing force to back up the recoil action of the spring. Piece 14 is the sliding seal which maintains a fluid tight system with movement of the spring and associate components. The thermocouple head, union, and pipe nipples unite the other parts to the vessel. A spacer, piece 9, is a bored cylindrical piece with a flanged end and serves to retain the spring piece 4 and the tube piece 2 having an external collar piece 3. The spacer piece also contains the O-ring seal which allows sliding motion of the tube, piece 2, without escape of fluid across the seal.

The above described unit without the thermowell serves an important function on the bearings of large machinery such as electrical generators. Through the bearing housing flows oil which serves both as a lubricant and a coolant. The temperature measurement of the sleeve, which supports the rotating shaft, is necessary in order to avoid bearing failure. When the thermocouple assembly is mounted on the bearing housing, the seal, which is my invention keeps the oil from being forced into the temperature sensing electrical lead lines. This seal is a dynamic seal which permits the thermocouple to move under spring pressure to maintain contact on the sleeve as it expands and contracts with change in temperature. Some bearing designs require the sleeve whose temperature is to be measured, to be insulated from the bearing housing. If piece 5 is made of insulating material and a gasket 17 is placed at the top of spacer piece 9, then the sleeve continues to be insulated from the bearing housing even when piece 2 bears against it.

I claim:
1. A temperature measuring assembly comprising a temperature sensing element, a tube containing said temperature sensing element, an external collar integrally attached to said tube, a helical spring placed about said tube having the first end of said helical spring resting against said external collar, an internal collar which receives said tube with free sliding action and rests against the second end of said helical spring, a thermocouple head which holds said internal collar, a pipe nipple which joins to said thermocouple head, a pipe union first half which is joined to said pipe nipple, a pipe union second half, an O-ring seal, a washer shaped gasket, a spacer, said space being a bored cylindrical piece with a flanged end, said bored cylindrical piece containing said O-ring seal and sealing about said tube with free sliding action and said washer shaped gasket sealing at said flanged end, said flanged end being held by said pipe union first half and said washer shaped gasket, said washer shaped gasket resting on said pipe union second half, a second pipe nipple joined to said pipe union second half, a thermowell joined to said second pipe nipple, said temperature measuring assembly having dimensions such that said helical spring is compressed and said tube is firmly pressed against the interior surface of said thermowell with free sliding action working against the spring.

2. A temperature measuring assembly as described in claim 1 wherein an electrically insulating gasket is placed at the top of said spacer and said internal collar is an insulating material.

3. A temperature measuring assembly comprising a temperature sensing element, a tube containing said temperature sensing element, an external collar integrally attached to said tube, a helical spring placed about said tube having the first end of said helical spring resting against said external collar, an internal collar which receives said tube with free sliding action and rests against the second end of said helical spring, a thermocouple head which holds said internal collar, a pipe nipple which joins to said thermocouple head, a pipe union first half which is joined to said pipe nipple, a pipe union second half, an O-ring seal, a washer shaped gasket, a spacer, said spacer being a bored cylindrical piece with a flanged end, said bored cylindrical piece containing said O-ring seal and sealing about said tube with free sliding action and said washer shaped gasket sealing at said flanged end, said flanged end being held by said pipe union first half and said washer shaped gasket, said washer shaped gasket resting on said pipe union second half, a fluid filled system joined to said second pipe nipple, said temperature measuring assembly having dimensions such that said helical spring is compressed and said tube is firmly pressed against the interior surface of said fluid filled system with free sliding action working against the spring.

References Cited
UNITED STATES PATENTS 3,044,298  7/1962  Hodges _____ 73—343
3,281,518  10/1966  Stroud _____ 73—343

LOUIS R. PRINCE, Primary Examiner

DENIS E, CORR, Assistant Examiner

U.S. Cl. X.R.

73—343; 136—233